Nov. 11, 1947.   E. I. STEARNS, JR., ET AL   2,430,834
PHOTOMETRIC APPARATUS GIVING READINGS INVARIANT
WITH AZIMUTH ON POLARIZING SAMPLES
Filed June 1, 1944   5 Sheets-Sheet 4
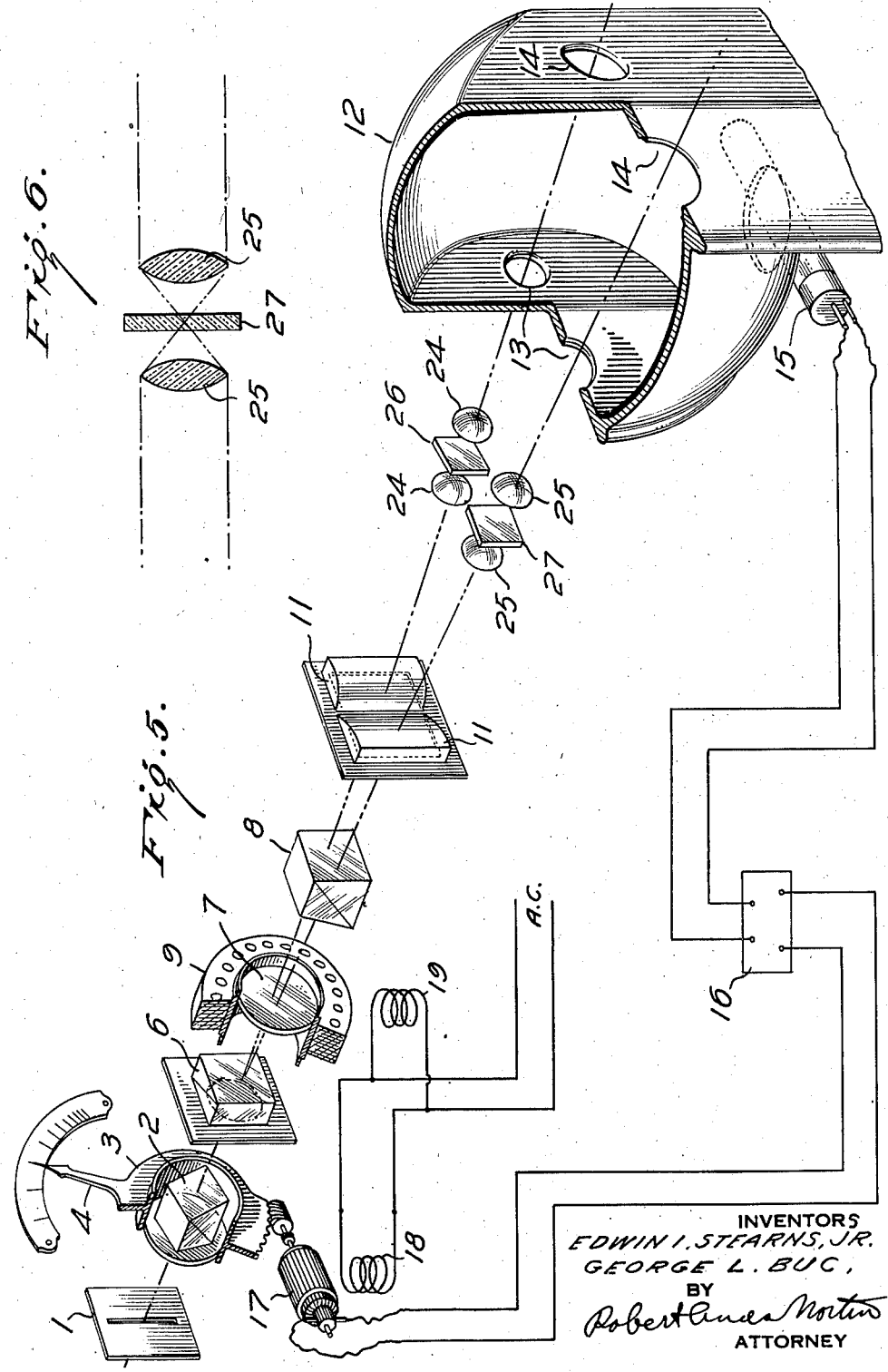
INVENTORS
EDWIN I. STEARNS, JR.
GEORGE L. BUC,
BY
Robert Andres Norton
ATTORNEY Nov. 11, 1947.  E. I. STEARNS, JR., ET AL  2,430,834
PHOTOMETRIC APPARATUS GIVING READINGS INVARIANT
WITH AZIMUTH ON POLARIZING SAMPLES
Filed June 1, 1944   5 Sheets-Sheet 5

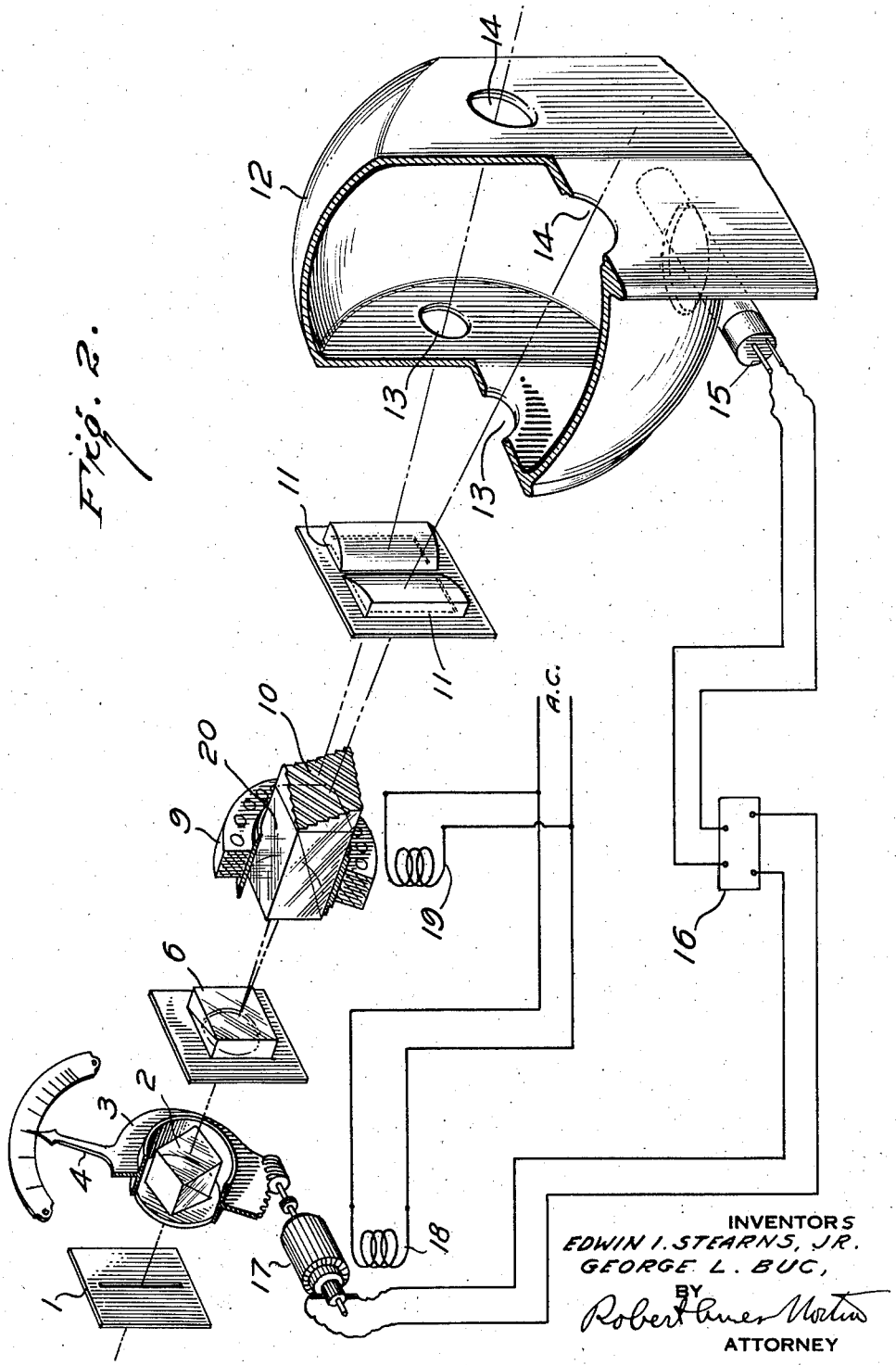

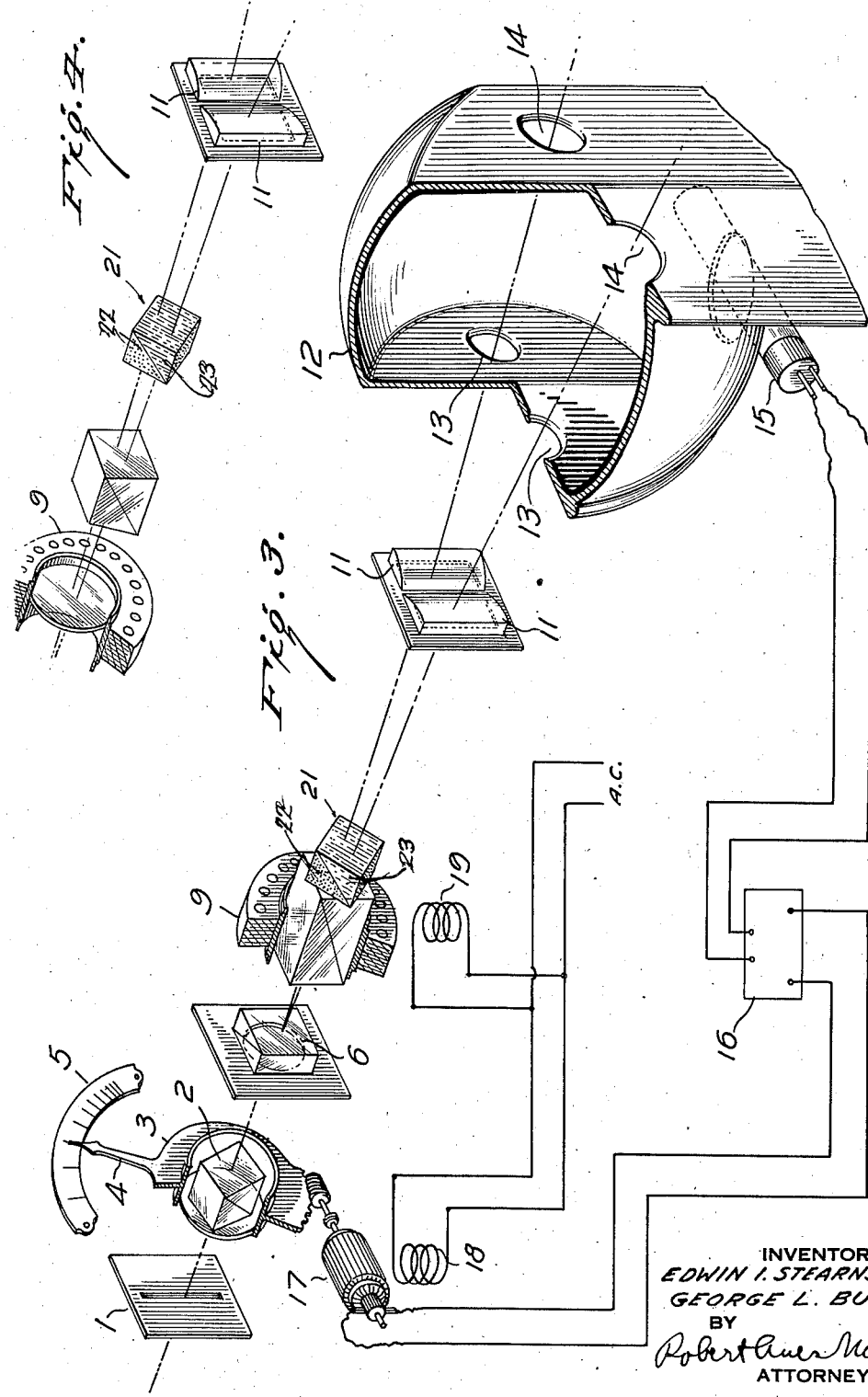

INVENTORS
EDWIN I. STEARNS JR.
GEORGE L. BUC.
BY
Robert Ames Norton
ATTORNEY

Patented Nov. 11, 1947

2,430,834

UNITED STATES PATENT OFFICE 2,430,834

PHOTOMETRIC APPARATUS GIVING READINGS INVARIANT WITH AZIMUTH ON POLARIZING SAMPLES

Edwin I. Stearns, Jr., North Plainfield, and George L. Buc, Orange, N. J., assignors to American Cyanamid Company, New York, N. Y., a corporation of Maine Application June 1, 1944, Serial No. 538,306

15 Claims. (Cl. 88—14)

This invention relates to improved photometric devices involving polarizing elements.

A number of photometric devices have been developed and some of them involve polarizing elements. In some cases the polarization is incidental and performs no useful function. Thus, for example, monochromating devices produce varying degrees of polarization at different wave lengths of light in the visible, ultra violet and infrared spectrum. The polarizing may be due to reflection from mirrors or other elements incidental to the photometric apparatus. In most cases the polarization performs no useful function but is unavoidable. Examples of such devices are ordinary photometric spectro-photometers, spectrographs and the like.

Another type of photometric apparatus in which polarization may enter is comparison colorimeters using split comparison fields. An example of such is a Duboscq colorimeter in which polarization results from the mirrors in the instrument. In general any photometer which uses a mirror will introduce various degrees of polarization.

Some photometric instruments and spectrophotometers use polarization deliberately to effect photometering. A simple instrument of such a type is a Martens photometer in which light beams from a sample and standard pass through a Wollaston prism which polarizes them at right angles. Polarizers such as a Nicol or a Rochon prism effect photometering. This type of device is also used in the Koenig-Martens spectrophotometer.

In more recent years polarized flickering beam spectrophotometers have achieved great success and their speed and precision account for their predominate position.

All of these types of apparatus possess a common characteristic, namely the optical system includes a sample illuminating means and photometering means in which at least one element polarizes light partially or wholly. All of these instruments give different readings when a polarizing sample is present depending on the orientation of the sample, that is to say its azimuth with respect to the optical axis of the polarizing elements of the instrument. This variance is known as the azimuth effect and introduces a serious error even in the most highly developed spectrophotometers of the polarizing flickering beam type. The first successful commercial machine of this type is described and claimed in the patent to Orrin Weston Pineo, No. 2,107,836, February 8, 1938.

In this spectrophotometer, light from a Van Cittert double monochromator passes through a photometering Rochon prism, then through a Wollaston prism and finally through a Rochon prism which is rotated at an accurately predetermined rate by means of a synchronous motor. The two beams from the Wollaston prism which are polarized at right angles to each other after passing through the rotating Rochon strike samples and standards of either reflectance or transmission and the total light from the two beams is integrated in an integrating sphere and the integrated light impressed on a phototube which is in the input circuit of a very high gain audio frequency amplifier. The amplified output is then impressed on the armature of a motor, the field of which is supplied with the same current used in driving the synchronous motor and in turn drives the photometering Rochon prism in a direction which will result in a change in intensity of the flickering beams to cause the light from each beam in the integrating sphere to be equal, at which time there is present in the integrating sphere no light fluctuation at flicker frequency and hence no amplified signal at flicker frequency. The photometering motor may drive an indicating device or an automatic recorder of known design.

The polarized flickering beam spectrophotometer has achieved great success because in its most elaborate modifications curves of photometric absorption or reflectance can be automatically drawn in a very short time. Great as is the advance represented by the polarized flickering beam spectrophotometer over early instruments, in its original form the device had some disadvantages. By this method, the light incident on the specimen is varying its plane of polarization, so that in many cases an unknown factor of variation is introduced which may vitiate the results. Further, spurious signals of the fundamental and harmonic frequencies are produced in the photo-cell circuit which obscure the vanishing signal at balance and so result in loss of sensitivity in detecting the balance point.

In the patent of O. W. Pineo, No. 2,126,410, August 9, 1938, there are described a number of different flickering means which when followed by a stationary polarizer, such as for example a Rochon prism, produce reliable flickering with beams which maintain a constant plane of polarization instead of a plane which rotates with rotation of the flicker prism as in the early Pineo patent referred to above. These means include a rotating retardation plate, such as a half wave plate, Kerr cells impressed with alternating voltage at flicker frequency or magnetostrictive devices. In the improved instrument which is described in the two Pineo patents the reduced sensitivity with polarizing samples is completely overcome and for the first time it becomes possible to obtain reliable and accurate spectrophotometric measurements of polarizing samples. The great advance in sensitivity and accuracy with polarizing samples, however, is obtained only if the orientation of the sample is constant and hence the azimuth of polarization does not change. Conflicting results are obtained if the same sample is measured at different azimuths.

In the patent of O. W. Pineo, No. 2,189,270, February 6, 1940, there is described an improvement on the instrument using a stationary plane of polarization in which the final Rochon prism is followed either by a quarter wave plate or a Fresnel rhomb. Both of these devices transform plane polarized light into circularly polarized light which is not sensitive to change in azimuth of the sample. The improvement described in the last mentioned Pineo patent, while of definite practical value, was not a complete solution of the azimuth problem because unfortunately a quarter wave plate gives a retardation of exactly a quarter of a wave length at only one frequency of light. Lights of other frequencies within the visible spectrum are not circularly polarized but are elliptically polarized with ellipses of increasing eccentricity as the frequency of the light varies from that at which the quarter wave plate gives a true retardation of a quarter of a wave length. The elliptically polarized light at other frequencies materially reduces the azimuth effect over plane polarized light but is still not perfect.

The Fresnel rhomb is less sharply selective with respect to wave length and from this standpoint gives a greater degree of azimuth correction. However, as described in the patent, it requires an offset in the light path and presents some mechanical disadvantages as compared to a quarter wave plate.

A somewhat different form of polarizing flickering beam spectrophotometer is one in which the integrating sphere is replaced by a lens which brings together the two divergent beams onto a phototube or other photoelectric device. In order to avoid critical adjustment the image on the photoelectric means may be thrown slightly out of focus or the beams may be focussed on a ground glass or similar diffuser so that the photoelectric means is illuminated by diffuse combined light. In the simple photometric apparatus or Pineo spectrophotometer the azimuth problem is the same.

According to the present invention the azimuth effect is averaged out geometrically at all wave lengths. The sample and or standard beams are passed through a device which produces a large number of zones of different retardations. For example, a stepped retardation plate may be used which is cut in a series of steps of different thicknesses and, therefore, will break the beam up into narrow bands which are subjected to different degrees of retardation. If the zones are properly chosen and sufficiently numerous, light over the whole sample and standard is averaged. Some of the light will be plane polarized in one direction, another band plane polarized at right angles to it, further bands elliptically polarized with major axes at right angles to each other, and at bands for which the retardation plate is a quarter wave plate or odd multiples thereof the light will be circularly polarized. The different path lengths may be obtained by using a retardation plate the surface of which is cut in a series of steps. The same result is obtained with a Babinet compensator and other means may be used. If a sufficient number of steps are used, a number of different states and orientations of polarized light will be present at each wave length although the orientation and nature of the polarized light in a particular portion of the beam passing through a particular step of the plate will be different for different wave lengths of light.

It is an important advantage of the present invention that the geometric averaging is independent of the spectral band width of light used. In most instruments this advantage is not so important because they operate with spectral bands of finite width or in the case of spectrographs and most colorimeters the full spectrum is used. However, photometers of either the polarized light beam flickering type or others may be used to effect measurements at a single wave length. For example, light from a source giving a sharp line spectrum may be associated with filters which eliminate all but one line. While this use is less common it is an advantage of the present invention that the elimination of the azimuth effect is just as efficient with a narrow band or even with monochromatic light. Certain devices for eliminating the azimuth effect described in our co-pending application Serial No. 569,946, filed December 27, 1944, on the other hand are dependent on the use of a band of light with a substantial frequency range.

The element which splits the sample and/or standard beams into a series of bands of different retardation must be located between the sample and the nearest element in the device which introduces polarization because the desired effect is to cancel out asymmetrical polarization by the sample. If the beam is split into bands beyond the nearest polarizing element it will be ineffective because the damage will already have been done.

The design of the optical instrument will determine whether the beam splitting element can be single or whether separate beam splitters must be used. In flickering beam spectrophotometers, spectrographs, such as a Hilger spectrograph, Martens photometers and Koenig-Martens spectrophotometers the beams from sample and standard are so closely adjacent that single beam splitting device may be used. In other instruments such as a Duboscq colorimeter the beams may be too far apart and separate beam splitting elements are then necessary. Wherever possible it is desirable to use a single beam splitting device as no difficulty is involved in matching.

The essential feature of the present invention is the breaking up of the beams into a series of beams passing through different thicknesses of the retardation plate. The stepped plate represents a simple mechanical method of obtaining this effect. However, the cutting of a stepped retardation plate presents a difficult problem which increases the cost. A Babinet compensator may be used in which two wedge shape pieces of birefringent transparent material are mounted with an apex of one opposite the base of the other. One of the pieces is cut parallel to the crystal axis as a retardation plate and the other along a plane at right angles to said axis. Such a compensator is produced more easily, but is somewhat less compact.

The devices described above are the simplest arrangements in which varying path lengths through the retarding material are provided. The present invention is not limited to this particular method of obtaining retardation paths of different lengths. It is possible to pass each beam through a pair of very thick lenses with an interposed retardation plate. The edges of the beam pass diagonally through the plate while the central rays pass straight through. Although the plate thickness is the same the path lengths of the different portions of the beam vary. This modification involves more optical elements and introduces somewhat more loss of light due to reflection. It is, therefore, not as desirable a modification as the first unless coated optics are used. The geometric averaging obtained will be the same and produces satisfactory results.

While the elimination of the azimuth effect is generally effected by means of the present invention in any of the types of photometering instruments involving polarization it produces additional results in certain polarized flickering beam spectrophotometers. In a Pineo spectrophotometer using half wave plate flickering, only elimination of azimuth effect results. When, however, Rochon flickering is used an important additional advantage is obtained because the lack of sensitivity in measuring polarizing samples is overcome. In instruments using Rochon flickering, the present invention presents two advantages instead of one and it is a further advantage that the two results are obtained without any compensating disadvantages. The Babinet compensator or stepped retardation plate must maintain a fixed orientation in instruments using Rochon flickering. Its orientation must be at 45° with respect to the axis of the Rochon prism and this requires that the device rotate with the prism which can be effected by cementing a Babinet compensator or stepped retardation plate to the rear face of the flicker prism. No reconstruction of the instrument is required. It is thus possible by means of the present invention to modernize existing equipment at nominal cost as well as to permit the design of new equipment of improved effectiveness. Because of the comparatively high cost of automatic recording spectrophotometers of the flickering beam type, this is an important, economic advantage because it is not necessary to scrap a comparatively large investment in equipment in order to obtain improved performance.

The invention will be illustrated in connection with the drawings in which:

Fig. 2 is a similar perspective view of a spectrophotometer using a Rochon flicker prism;

Fig. 3 is a perspective of a spectrophotometer similar to Fig. 2 in which a Babinet compensator replaces the stepped plate;

Fig. 4 is a detail of a half wave plate flicker mechanism similar to Fig. 1 with a Babinet compensator;

Fig. 5 is a perspective of a spectrophotometer similar to Fig. 1 using a pair of thick lenses with an interposed retardation plate in each beam;

Fig. 6 is a vertical cross section on an enlarged scale through a pair of lenses with an interposed retardation plate as shown in Fig. 5;

Figure 1:
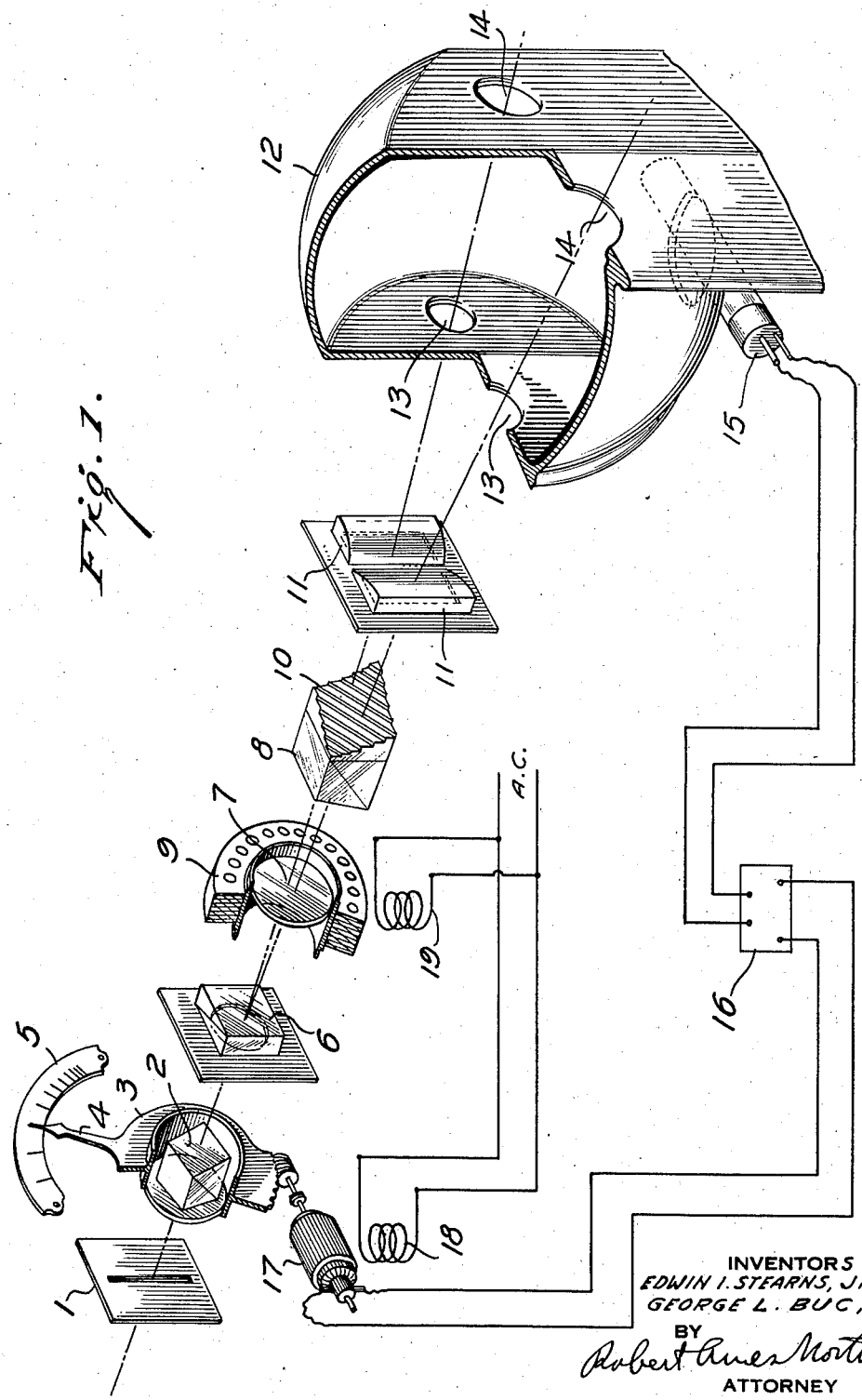
Fig. 1 is a perspective view of an indicating spectrophotometer using half wave plate flickering and a stepped retardation plate.

In the spectrophotometer shown in Fig. 1, a narrow band of light emerges from the exit slit 1 of the monochromator (not shown) which may be of any conventional design. The beam then passes through a photometering prism 2 carried in a rotatable hollow sleeve 3 which is provided with a pointer 4 moving over a scale 5. The photometering prism, which is a Rochon prism, serves the purpose of transforming the light into plane polarized light which is then passed through a Wollaston prism 6 which splits the beam into two divergent beams plane polarized at right angles to each other. The two beams then pass through a half wave plate 7 which is rotated at one quarter flicker frequency by a synchronous motor 9. The half wave plate causes the planes of polarization of the two beams to rotate at the same rate.

The beams then pass through the stationary Rochon prism 8 and finally through a stepped retardation plate 10. The prism 8 causes the two beams to flicker in opposite phases, both beams being plane polarized. The plane polarized light passing through the retardation plate 10, which is mounted with the optical axis at 45° to the axis of the Rochon prism 8, is retarded in different zones of the plate to different degrees. The two beams then pass through the conventional decentering lenses 11 and enter the integrating sphere 12 through the windows 13 and may encounter reflectance samples and standards mounted behind the windows 14. Each sample is illuminated with a beam which is split into narrow zones of light, the light being differently polarized in the several zones and the axes of polarization being symmetrically oriented so that the average response from a polarizing sample is the same as from a non-polarizing sample, regardless of the azimuth of the polarizing sample, provided, of course, that the latter is of sufficiently uniform composition so that the finite area illuminated by the beam will give a true average reflectance.

When the two beams reflected from the sample and standard are of equal intensity the integrated light in the sphere does not change, but if the reflectance of the sample for a particular wave length changes, for example increases, until the reflectances of sample and standard are unequal, the integrated light will pulsate in phase with the more intense of the two beams.

The integrated light strikes the phototube 15 which transforms it into a flicker frequency signal which is amplified by a high gain audio frequency amplifier 16. The amplified output is applied to the armature 17 of a motor driving the sleeve 3 through suitable gearing. The field 18 of the motor 17 and the field 19 of the motor 9 are fed from the same source of alternating current at flicker frequency. The phase is such that the rotation of motor 17 is in a direction to decrease the more strongly reflected beam and increase the other until balance is once more established in the integrating sphere.

The amount by which the Rochon prism 2 has to be turned to restore balance is a measure of absorption by the sample at the particular wave length and can be read on the scale 5. If a record is desired motor 17 can drive a conventional recorder in the conventional manner.

In the drawing for sake of clarity the thickness of retardation plate 10 has been greatly exaggerated so that the steps can be clearly shown. In practice it is only a very few millimeters thick.

Fig. 2 is a spectrophotometer similar to Fig. 1, the same elements bearing the same reference numerals, but using the Rochon prism 20 rotated by the motor 9. The stepped plate is cemented onto the rear face of the prism so that it rotates with it and its axis is at 45° with respect to the axis of the prism. The operation of the spectrophotometer is the same as in Fig. 1 and the azimuth effect is eliminated in the same manner. However, the stepped plate 10 performs two functions in Fig. 2. In Fig. 1 the stepped plate merely removes the azimuth effect and the other disadvantage of half wave plate flickering, namely reduced range, is in no way affected. In the modification of Fig. 2, however, the low sensitivity to polarizing samples of Rochon flickering is eliminated. The advantages of Rochon flickering are retained and therefore in the modification of Fig. 2 the stepped plate performs two functions instead of one. The stepped plate is so compact and light that it can be incorporated into existing machines.

Fig. 3 is similar to Fig. 2; the same parts bearing the same reference numerals, but the stepped plate 10 being replaced by a Babinet compensator 21 consisting of two wedges 22 and 23, one cut at right angles to the crystal axis and one cut parallel thereto. One of the two wedges of the Babinet compensator is a retardation plate and it is opposed by the other element giving the effect of paths of varying retardation for the beams passing through it. The operation is precisely the same as in Fig. 2. The Babinet compensator is cheaper to make than the stepped plate of Figs. 1 and 2 and is, therefore, preferred. In the drawing the thickness of the Babinet compensator has been exaggerated for clearness.

Fig. 4 shows a detail of half wave plate flickering mechanism such as that illustrated in Fig. 1, a Babinet compensator taking the place of the stepped retardation plate 10. The performance is identical.

Fig. 5 shows a spectrophotometer using half wave plate flickering as in Fig. 1. The beams after passing through decentering lenses 11 pass thru pairs of lenses 24 and 25 with interposed flat retardation plates 26 and 27.

In Fig. 6 the paths of the extreme edge rays and the central ray of the beam are diagrammed. This figure is on a larger scale than Fig. 5 and shows clearly that the plates 26 and 27 provide paths of varying lengths. The different length paths through the retardation plate produce different zones of retardation in the beam and geometric averaging is obtained which is similar to that in Figs. 1 to 4.

The location of the pairs of lenses and flat retardation plates is not critical and may be anywhere between the stationary Rochon prism 8 and the integrating sphere. They are shown between the integrating sphere and the decentering lenses as this permits better illustration. In practice the location will be determined by the space available as there is nothing critical about placement.

Figure 7:
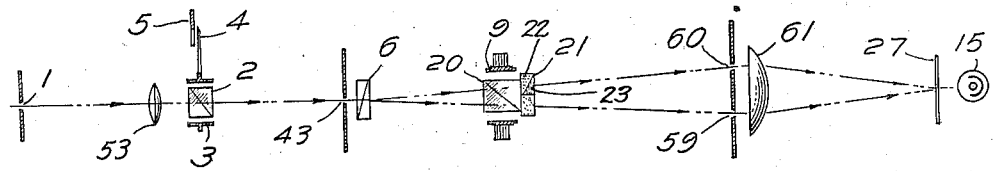
Fig. 7 is a diagrammatic view of a flickering beam spectrophotometer using Rochon flickering and a recombination of the two beams instead of an integrating sphere.

Fig. 7 is a diagrammatic view of the optics of a polarizing light flickering beam spectrophotometer using combined images instead of an integrating sphere. The same parts bear the same reference numbers. The light issuing from the monochromator exit slit 1 is imaged on slit 43 by the lens 53. The beam passes through a photometering Rochon prism 2 mounted in a rotatable sleeve 3 carrying a pointer 4 which moves over a scale 5. After leaving the slit 43 the beam passes through a Wollaston prism 6 which splits it into two divergent beams, plane polarized at right angles to each other. The beams then pass through a Rochon flicker prism 20 rotated by the motor 9 and having cemented to its rear face a Babinet compensator 21, the axes of which are at 45° to the axis of the flicker prism. The operation of the device is the same as in Fig. 3, each beam being split into an infinite number of bands of different retardation which beams then pass through sample and standard windows 59 and 60, and are focused by the lens 61 onto the plane of a ground glass screen 27. The diffused light of the combined images illuminates the phototube 15, the output of which can be amplified to effect photometering in the conventional manner as is shown in Figs 1, 2, 3 and 5.

The operation of the spectrophotometer is the same as shown in Figs. 1 to 6 except that it is suitable only for transmission samples. The correction of the azimuth effect and the improved sensitivity of the Rochon flickering with polarizing samples are the same as in Figs. 2 and 3.

Figure 8:
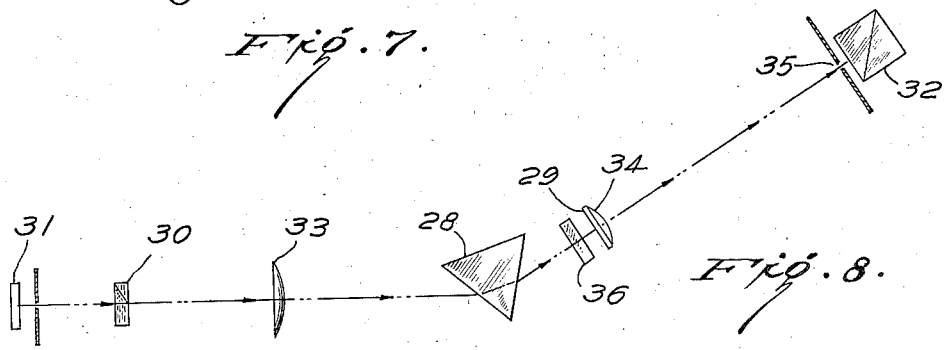
Fig. 8 is a diagrammatic elevation of a Koenig Martens spectrophotometer using a Babinet compensator.

Fig. 8 illustrates a split field type of spectrophotometer, namely, a Koenig-Martens spectrophotometer in which light from a sample and standard is monochromated and photometered. The view is a horizontal elevation and shows the beam from one of the two samples 31. This beam passes through a Babinet compensator 30 and is collimated by the lens 33 and passes through a rotatable dispersing prism 28. The spectra from the two beams then pass through a Wollaston prism 36, the axis of which is at right angles to the plane of the figure, and finally through a biprism 29 and lens 34 which images the spectra on a slit 35. The narrow band of light from the slit then passes through a photometering polarizer 32 which can be turned to make the two fields from sample and standard beams equal in brightness. The figure is a diagram of the optics only, the photometering Rochon prism being naturally mounted in the conventional manner.

Non-uniform response from polarizing samples and standards at different azimuths is completely averaged by the Babinet compensator 30 which is the only added element. The usefulness of the instrument is therefore extended to polarizing samples by the addition of a cheap optical element which does not require reconstruction of the instrument. The instrument may be used with any type of illumination including that having line spectra.

Figure 9:
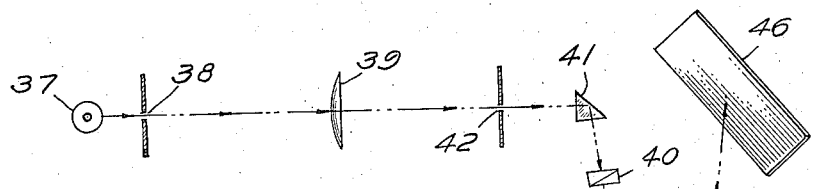
Fig. 9 is a perspective diagram of a Hilger spectrograph using a beam splitting device of the present invention.

Fig. 9 is a diagram, partly in perspective, of a Hilger spectrograph. Light from a source 37, which may be, for example, ultra violet light, passes through the slit 38 collimating lens 39 and sample 42 onto the totally reflecting prism 41 inside the body of the spectrograph. The beam then passes through a Babinet compensator 40 and thence through the conventional lens 44 and dispersing prism 45 with reflecting back, and again through the lens 44 onto the photographic plate holder 46. The diagram is that of a conventional spectrograph except for the element 40 which can be incorporated without any reconstruction of the instrument and which completely averages non-uniform responses from polarizing samples at different azimuths at all wave lengths of the spectrum. The inclusion of a relatively cheap optical element extends the usefulness of the spectrograph to the accurate measurement of polarizing samples regardless of the azimuth of the sample.

Figure 10:
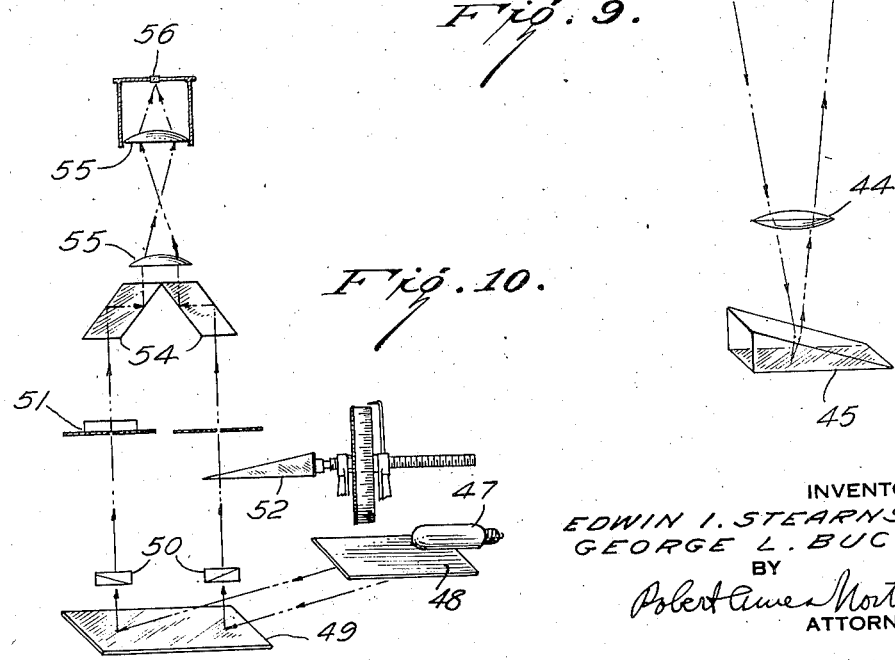
Fig. 10 is a perspective diagram of a Duboscq colorimeter using a pair of beam splitting elements.

Fig. 10 is a diagram, partly in perspective, of a Duboscq colorimeter equipped for measuring solid samples and provided with a pair of beam splitting devices of the present invention. A source of light 47 illuminates a diffusing screen 48 and the diffused light is reflected by the mirror 49 up through the instrument which includes a sample holder 51, photometering neutral wedge 52, double reflecting prisms 54, lenses 55 and ocular 56. The only change in the instrument is the provision of a pair of Babinet compensators 50, one in each beam. Non-uniform response with polarizing samples to the varying degrees of polarization introduced by the mirror 49 is completely eliminated and the colorimeter may be used with polarizing samples with the same accuracy as with other samples.

In Figs. 7 to 10 a Babinet compensator has been shown as the beam splitting device. Precisely the same results are obtained with stepped retardation plates or the combination of lenses and retardation plate shown in Figs. 5 and 6. The relative advantages and disadvantages of the different devices are discussed in connection with Figs. 5 and 6 and apply to Figs. 7 to 10.

The advantages of the invention are not limited to instruments operating on light in the visible spectrum although these instruments represent the largest field of photometric apparatus. Elimination of the azimuth effect by means of the present invention is just as important with machines using ultra violet or infrared so long as the light still becomes polarized. For this reason the term "light" will be used in a broader sense to include ultra violet and infrared. Similarly where reference is made to illumination it is not intended to limit the term to light in the visible spectrum.

When infrared or ultra violet light is used suitable sources must be employed and also suitable receptors. In the former case for the near infrared they may be phototubes as shown in Figs. 1 to 7. Fig. 9 requires only the use of optics of a suitable material and appropriately sensitized film for use in the infrared. In general, a Hilger spectrograph with quartz optics may be used for most measurements in the ultra violet and the near infrared.

Visual observation which is employed in the case of instruments shown in Figs. 8 and 10 must be replaced by photographic observation for the infrared and either photographic or fluorescent screen observation for the ultra violet.

We claim:

1. In a photometric apparatus including a sample support, means for illuminating a sample on said support and photometric means positioned to receive light from a sample on said support, an essential element of the apparatus being inherently capable of polarizing light to a material extent sufficient to give different responses from a polarizing sample at various orientations, the improvement which comprises means intermediate the sample support and said polarizing element providing a plurality of paths having different effects on the orientation of polarization of the light beam whereby the beam is broken up into a plurality of portions of different orientations of polarization, the characteristics of said paths being such that said orientations are symmetrically distributed through an angle of at least 180° whereby the azimuth effect in a polarizing sample is eliminated.

2. In a comparison photometric apparatus including supporting means for a sample and a comparison standard, illuminating means for the sample and comparison standard, photometric means and means for directing light from both sample and standard to the photometric means, an essential element of the apparatus being inherently capable of polarizing light to a material extent sufficient to give different responses from a polarizing sample or standard at various orientations, the improvement which comprises retardation means intermediate the sample and standard supporting means and said polarizing element which provide a plurality of paths of different retardation effects whereby the light beams are broken up into a plurality of portions of different orientations of polarization, said retardation effects being such that said orientations are symmetrically distributed through an angle of at least 180° whereby the azimuth effect in a polarizing sample is eliminated.

3. In a photometric apparatus comprising means for supporting a sample and a standard, a photoelectric device arranged to receive integrated light from a sample and a standard on said supporting means, an optical system arranged to control the light received by said device comprising in series an angularly movable polarizing member, a second member having the property of dividing a light beam into two beams which are polarized respectively in planes at right angles to each other, an uniformly rotatable polarizer between the second member and the sample and standard supporting means capable of causing each beam to flicker by varying from a minimum to a maximum, the variations of the two beams being in opposite phase, electric driving means for the first member responsive to alternating current of a predetermined frequency, means for uniformly rotating the rotatable polarizer at such a speed as to cause the beams to flicker at the frequency to which the driving means of the first member is responsive, the photoelectric device being coupled to an amplifier capable of amplifying alternating current fluctuations produced by the device in response to fluctuations of light impinging thereon at flicker frequency, the electric driving means for the first member being connected to the output stage of the amplifier so that it is actuated by the flicker frequency component of the amplifier output to rotate the first polarizing member in a direction to produce integrated light from the sample and standard free from fluctuations at flicker frequency, the improvement which comprises retardation means intermediate the rotatable polarizer and said sample and standard supporting means providing a plurality of paths of different retardation effects whereby each beam is broken up into a plurality of portions of different orientations of polarization, said retardation effects being such that said orientations are symmetrically distributed through an angle of at least 180° whereby the azimuth effect in a polarizing sample is eliminated.

4. In a photometric apparatus comprising means for supporting a sample and a standard, a photoelectric device arranged to receive integrated light from a sample and a standard on said supporting means, an optical system arranged to control the light received by said device comprising in series an angularly movable polarizing member, a second member having the property of dividing a light beam into two beams which are polarized respectively in planes at right angles to each other, an uniformly rotatable polarizer between the second member and the sample and standard supporting means capable of causing each beam to flicker by varying from a minimum to a maximum, the variation of the two beams being in opposite phase, electric driving means for the first member responsive to alternating current of a predetermined frequency, means for uniformly rotating the rotatable polarizer at such a speed as to cause the beams to flicker at the frequency to which the driving means for the first member is responsive, the photoelectric device being coupled to an amplifier capable of amplifying alternating current fluctuations produced by the device in response to fluctuations of light impinging thereon at flicker frequency, the electric driving means being connected to the output stage of the amplifier so that it is actuated by the flicker frequency component of the amplifier output to rotate the first member in a direction to produce integrated light from the sample and standard free from fluctuations at flicker frequency, means for passing to the first member a beam of substantially monochromatic light and means for varying the wave length of said monochromatic light from one end of the spectrum to the other, the improvement which comprises retardation means intermediate the rotatable polarizer and said sample and standard supporting means to provide a plurality of paths of different retardation effects whereby each beam is broken up into a plurality of portions of different orientations of polarization, said retardation effects being such that said orientations are symmetrically distributed through an angle of at least 180° whereby the azimuth effect in a polarizing sample is eliminated.

5. In a photometer comprising in optical alignment the following elements, a source of light, means capable of producing two divergent beams of light polarized at right angles to each other, means for rotating the planes of polarization of the beams at a predetermined frequency, a fixed polarizing element through which the polarized beams pass, means for supporting in the paths of said beams a standard and a sample to be measured and an adjustable photometric element, the adjustment of which varies the relative intensities of the two polarized beams, the improvement which comprises retardation means intermediate the fixed polarizing element and said sample and standard supporting means providing a plurality of paths of different retardation effects whereby each beam is broken up into a plurality of portions of different orientations of polarization, said retardation effects being such that said orientations are symmetrically distributed through an angle of at least 180° whereby the azimuth effect in a polarizing sample is eliminated.

6. An apparatus according to claim 1 in which the means providing a plurality of paths is a stepped retardation plate.

7. An apparatus according to claim 2 in which the retardation means providing a plurality of paths is a stepped retardation plate.

8. An apparatus according to claim 3 in which the retardation means providing a plurality of paths is a stepped retardation plate.

9. An apparatus according to claim 4 in which the retardation means providing a plurality of paths is a stepped retardation plate.

10. An apparatus according to claim 5 in which the retardation means providing a plurality of paths is a stepped retardation plate.

11. An apparatus according to claim 1 in which the means providing a plurality of paths is a Babinet compensator.

12. An apparatus according to claim 2 in which the retardation means providing a plurality of paths is a Babinet compensator.

13. An apparatus according to claim 3 in which the retardation means providing plurality of paths is a Babinet compensator.

14. An apparatus according to claim 4 in which the retardation means providing a plurality of paths is a Babinet compensator.

15. An apparatus according to claim 5 in which the retardation means providing a plurality of paths is a Babinet compensator.

EDWIN I. STEARNS, Jr.
GEORGE L. BUC.

REFERENCES CITED

The following references are of record in the file of this patent:

UNITED STATES PATENTS

| Number | Name | Date |
| --- | --- | --- |
| 2,189,270 | Pineo | Feb. 6, 1940 |

FOREIGN PATENTS

| Number | Country | Date |
| --- | --- | --- |
| 587,850 | Germany | Nov. 9, 1933 |